United States Patent [19]

Smith

[11] Patent Number: 5,224,012

[45] Date of Patent: Jun. 29, 1993

[54] SOLID STATE STATION PROTECTORS
[75] Inventor: Thomas J. Smith, Bay Shore, N.Y.
[73] Assignee: Tii Industries Inc., Copiague, N.Y.
[21] Appl. No.: 958,674
[22] Filed: Oct. 9, 1992

Related U.S. Application Data

[63] Continuation of Ser. No. 524,740, May 17, 1990, abandoned.

[51] Int. Cl.⁵ .............................................. H02H 3/22
[52] U.S. Cl. .................................. 361/119; 361/124; 361/127
[58] Field of Search ............... 361/119, 124, 129, 130, 361/127; 337/31, 32

[56] References Cited

U.S. PATENT DOCUMENTS

4,796,150  1/1989  Dickey et al. ...................... 361/119
4,851,956  7/1989  Borkanicz et al. .................. 361/118
4,958,253  9/1990  Gilberts et al. ...................... 361/119
4,958,254  9/1990  Kidd et al. ........................... 361/119

Primary Examiner—Todd E. DeBoer
Attorney, Agent, or Firm—Sachs & Sachs

[57] ABSTRACT

A miniature solid state surge protector apparatus for use in telephone central offices, or the like, that are provided with terminal blocks for communication lines which may include an in-line overcurrent coil arrangement that grounds each communication line if an overcurrent flows therethrough and is additionally provided with a solid state miniaturized surge protection device disposed across a pair of communication lines and a common ground terminal, thus providing overvoltage and overcurrent protection (fail short) to a pair of telephone communication lines.

8 Claims, 5 Drawing Sheets

SOLID STATE STATION PROTECTORS

This is a continuation of Ser. No. 524,740, filed May 17, 1990, abandoned.

BACKGROUND OF THE INVENTION

1. Field of the Invention

The present invention relates to surge protection devices and, in particular, relates to a miniature solid state surge protection device for use on telephone central office communication line terminal blocks, or the like, to provide a overvoltage and overcurrent or fail short protection.

2. Discussion of the Relevant Art

Overvoltage and overcurrent (fail short) surge protectors for communication lines are abundant in the art and they are generally directed to protect the instruments at the point of installation, e.g. home or business. Typical of these devices are U.S. Pat. No. 4,701,825 issued to E. J. Pagliuca on Oct. 20, 1987; U.S. Pat. No. 4,603,368 issued to E. J. Pagliuca on Jul. 29, 1986; and U.S. Pat. No. 4,351,015 issued to T. J. Smith on Sep. 21, 1982. All of these devices are installed at the terminals of the equipment to be protected and are generally unsuitable for use at a telephone central office. U.S. Pat. No. 4,424,546 issued to T. J. Smith on Jan. 3, 1984 is the only one of the above noted patents that is suitable for use at a telephone central office.

Typical of the terminal blocks used for connecting the telephone communication lines are those manufactured by Reliable Electric Company, Franklin Park, Ill., Model Number R713-1,2,3 or 4 or terminal blocks manufactured by TII Industries, Inc., Model Number TII 561/571 Series Building-Entry Protector Assemblies. These terminal blocks are utilized by telephone central office installations or at the entrance to buildings where a large number of telephone communication lines are provided. The terminal boards are adapted to receive protective modules such as Model Number 4AB, manufactured by Reliable Electric Company of Franklin Park, Ill., and are suitable for receiving the protector modules of the instant invention.

Earlier devices which were used at telephone central office installations either in connection with or proximate to central office terminal blocks that were utilized in the central office termination of communication lines require installation separate and apart from central office communication line terminal blocks and are large in size and, since they were not directly mounted on the terminal blocks but remote therefrom, do not always provide adequate protection to the lines. The solid state miniaturized devices as disclosed herein mount directly to the terminal blocks and afford a higher degree of protection. However, in order to improve reliability, insure protection and utilize the module cover as a dust cover, in addition to having access to the line terminals, a different assembly technique is required.

The present apparatus is small in size, may be mounted upon the central office communication line terminal block, is readily removable therefrom should it be necessary to replace a defective unit, provides for the replacement of the miniature solid state surge protector device and additionally includes overcurrent or fail short protection for the communication lines. When an overcurrent occurs on the communication line or if an overvoltage transient damages the overvoltage surge protector, the present surge protector provides a positive shorting connection between the communication line and ground.

Therefore, it is an object of the present invention to provide an economical, miniature central office surge protector apparatus capable of being used with central office communication line terminal blocks.

It is another object of the present invention to provide a miniature central office surge protector apparatus that protects for excessive line currents as well as overvoltage surges.

It is yet a further object of the present invention to provide a miniature surge protector apparatus that utilizes a solid state overvoltage protection device.

It is yet another object of the present invention to provide a miniature surge protector apparatus suitable for use on central office terminal blocks wherein the overvoltage solid state protection device may be readily removed and replaced.

It is still yet another object of the present invention to provide a miniature surge protector apparatus suitable for central office terminal blocks that is capable of providing fail short protection with a line current overload.

SUMMARY OF THE INVENTION

A miniature solid state surge protection device suitable for insertion into an electrically conductive hollow housing having a closed end and an open end disposed proximate a ground, according to the principles of the present invention, includes; an electrically conductive fusible pellet having a top surface and a bottom surface disposed within the housing. The pellet top surface is in electrically conductive contact with the closed end of the housing. A solid state device having a first electrode and a second electrode is in electrically conductive contact with the bottom surface of the pellet. A movable electrode has a top surface and a bottom surface with the top surface in electrically conductive contact with the second electrode of the solid state device. An insulator is adapted to receive the movable electrode therein, permitting the bottom surface of the movable electrode to extend therethrough. When the fusible pellet partially melts, the housing is permitted to come into electrically conductive contact with the ground providing fail short protection.

A miniature solid state surge protector apparatus for use in central office use, or the like, according to the principles of the present invention, comprises in combination; an insulated base adapted to be received by a central office terminal block having two pairs of in-line open terminal receptacles, one pair of terminal receptacles being disposed in each of a pair of communication lines, and a ground terminal receptacle. The base includes, two pairs of extending terminals adapted to be received by the receptacles of the central office terminal block providing electrical conductive contact therebetween. An electrically conductive device connects the first and the second terminal of each of the pair of extending terminals. A ground terminal extends on one end and is adapted to be received by the ground receptacle of the central office terminal block and is provided on the other end with an upwardly extending portion and a transverse portion, the transverse portion is disposed proximate each pair of the extending terminals. A miniature solid state surge protector apparatus includes a first terminal, a second terminal and a ground terminal. Included therein is a first and second solid state device having a pair of electrodes, the first solid state device is disposed in electrically conducting contact between the first protector assembly terminal and the ground terminal. The second solid state device is disposed between the second protector assembly terminal and the ground terminal. An insulated cover having an open end and a closed end is adapted to be removably retained by the base and encompasses the first and second solid state devices. A first and a second spring is disposed within the insulated cover; the first spring is disposed between the cover and the first solid state protector assembly terminal and the second spring is disposed between the cover and the second solid state protector assembly terminal. The first and second springs urge the first and second protector terminals towards the insulated base.

The foregoing and other object and advantages will appear from the description to follow. In the description, reference is made to the accompanying drawing which forms a part hereof, and in which is shown, by way of illustration a specific embodiment to which the invention may be practiced. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWING

In order that the invention may be more fully understood, it will now be described, by way of example, with reference to the accompanying drawing in which.

DESCRIPTION OF THE PREFERRED EMBODIMENT

Figure 1:
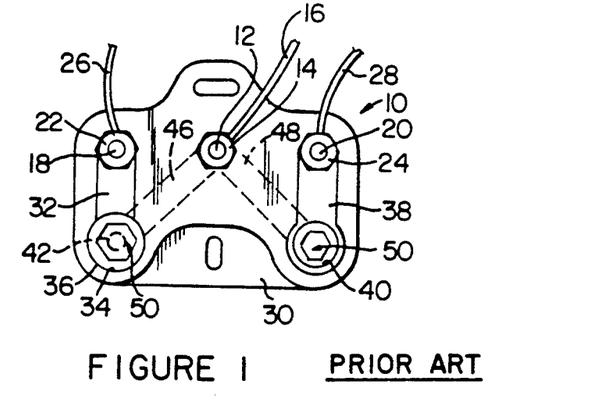
FIG. 1 is a top plan view of a typical telephone station protector apparatus wherein each communication line is protected by a miniature solid state overvoltage protection device, according to the principles of the present invention.

Referring now to the drawing, and in particular to FIG. 1, a station protector 10, known in the prior art, is shown therein and is seen to include a threaded ground terminal 12 and a nut and conventional prong and flat washers 14 to which a ground wire 16 is affixed. Two additional threaded terminals 18 and 20 are provided. The terminals have affixed thereon, in a similar manner, nuts 22 and 24 and their associated flat washers to which communication lines 26 and 28, respectively, are connected in a conventional manner. Terminals 12, 18 and 20 are retained, in a conventional manner, in a dielectric or insulated housing 30, which may be fabricated from any number of well-known materials.

The housing 30 is provided with an electrically conductive link 32, which extends from terminal 18 to a well-like aperture 34 provided in the housing. The link 32 extends about the periphery 36 of aperture 34 and extends downwardly into the aperture forming a continuous electrically conductive path from the upper portion of the well-like aperture to the line terminal 18. Aperture 34 is preferably threaded below the depth of the conductive link 32. In a similar manner, a conductive link 38 is provided between terminal 20 and the well-like aperture 40, which is also threaded below the depth of the link 38. Centrally disposed in apertures 34 and 40, extending in an upwardly direction is an electrically conductive ground button or protrusion or plate 42 (see FIGS. 3 and 5) which is affixed, in a conventional manner to the electrical conductors 46 and 48 (which may be fabricated as a unitary structure) to provide electrical conductive contact to the ground terminal 12.

Figure 2:
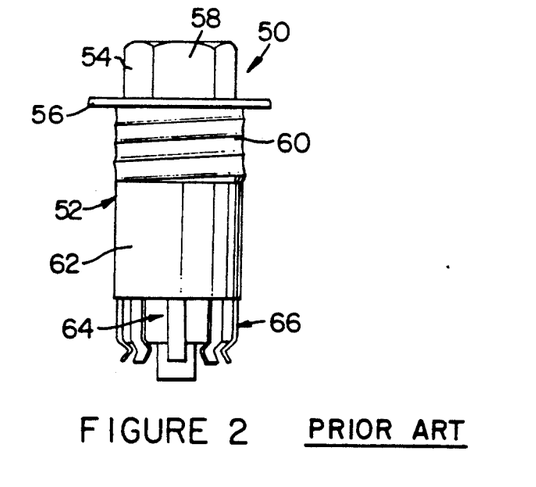
FIG. 2 is an enlarged end view in elevation of a known protector cartridge having a miniature solid state protection device disposed therein.

A protector cartridge 50 shown enlarged in FIG. 2 is inserted into the protector cartridge wells or apertures 34 and 40 of the insulated housing 30. The protector cartridge 50 includes an electrically conductive shell or cap 52, which is provided with a top portion 54 that is hexagonally-shaped, and has a annular radial flange 56 that is axially spaced from the end wall 58. The cartridge 50 further includes a threaded, cylindrically-shaped wall portion 60 and a cylindrical skirt portion 62 adjacent to and extending axially from the threaded portion 60. The skirt portion 62 terminates in an open end which is adapted to receive a solid state surge protection device 64, according to the principles of the present invention, or alternatively may receive a gas tube arrester manufactured by TII Industries, Inc., known as TII-59 or TII-44 tube assembly.

The protection device 64 is centrally disposed in a retaining cage 66, which is cylindrically-shaped having a flat end wall 68 with a plurality of fingers 70 extending therefrom or alternatively may terminate in a straight edge as is cage 70 (FIG. 5) and is formed to slideably retain the protector device 64 therewithin. A more detailed description of a particular conventional type protection device known in the prior art is disclosed in U.S. Pat. No. 4,447,848 issued to T. J. Smith on May 8, 1984 and those cited earlier.

Figure 3:
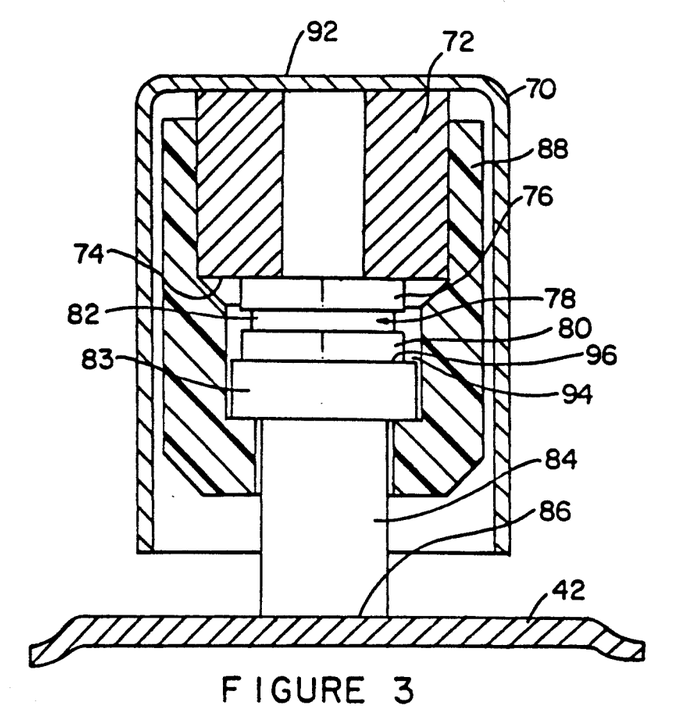
FIG. 3 is a greatly enlarged cross-sectional view of a miniature solid state protection device, disposed within the cartridge of FIG. 2 in its normal operating position.
Figure 4:
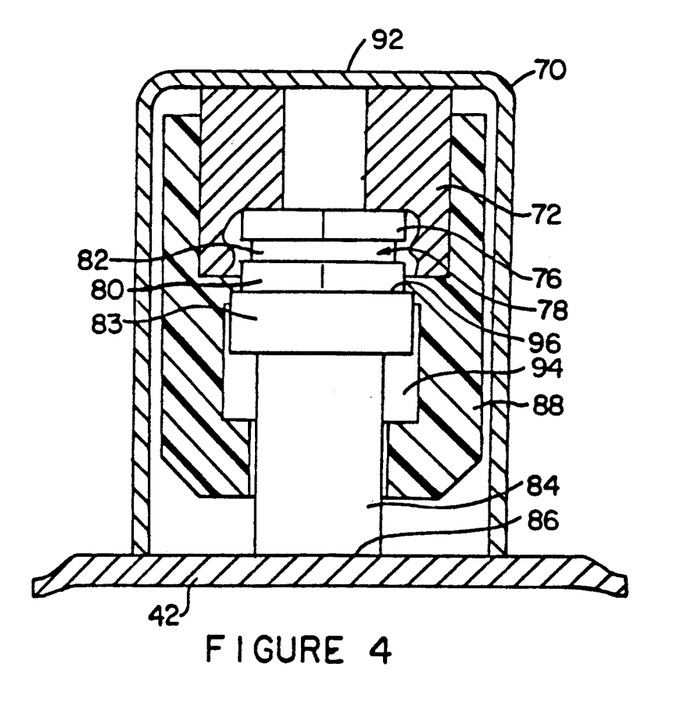
FIG. 4 is a cross-sectional view in elevation of the miniature solid state protection device in its shorted or fail safe condition, according to the principles of the present invention.
Figure 5:
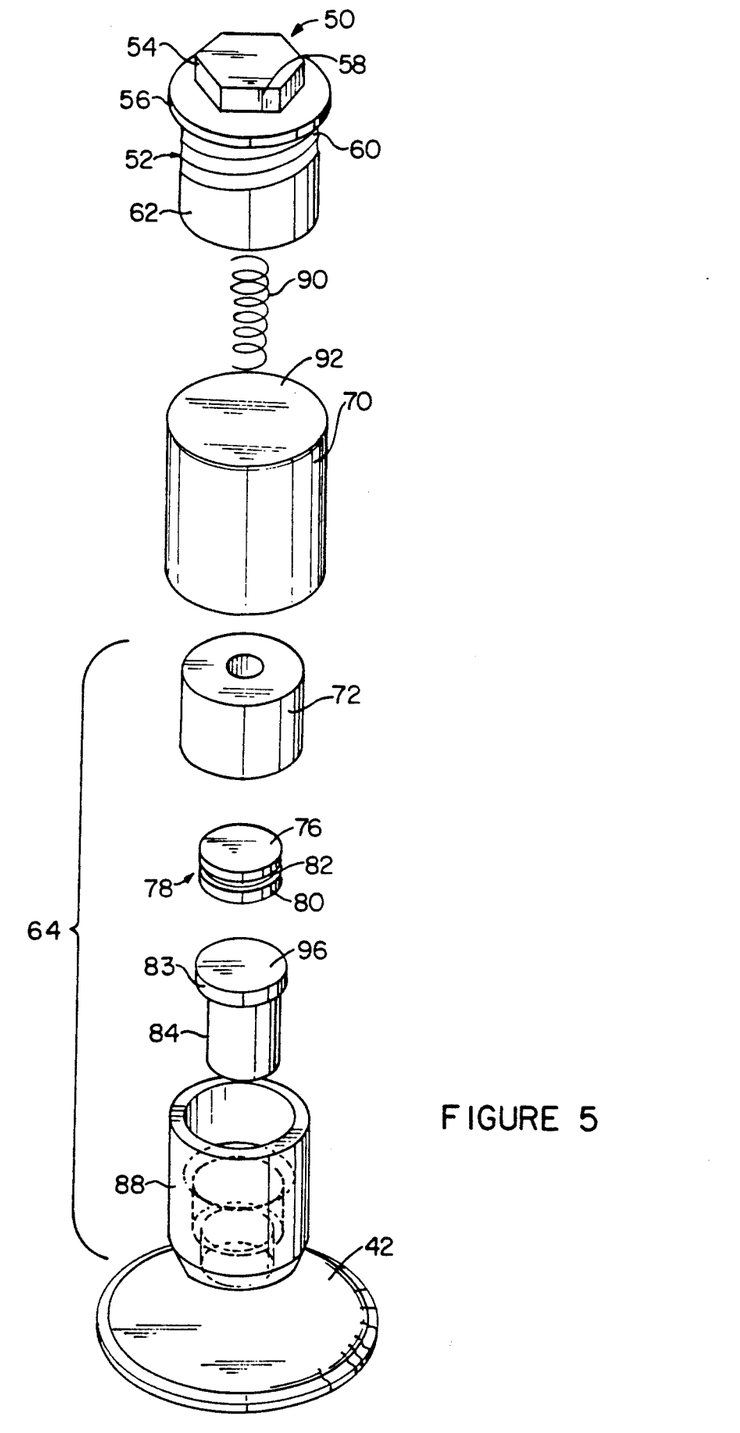
FIG. 5 is an enlarged, exploded view of the miniature solid state protection device showing the elements thereof disposed in a housing adapted to be received into the cartridge shown in FIG. 2, proximate a ground terminal.

Referring now to FIGS. 3, 4 and 5 there is shown a housing or canister 70 which is adapted to receive the miniature solid state surge protection device 64, according to the principles of the present invention. The canister 70 has a fusible pellet 72 in electrically conductive contact with the closed end 92 of the canister 70. The fusible pellet 72 is suitable and adapted to melt at a relatively low temperature and has the lower surface 74 thereof in electrically conductive contact with one electrode 76 of the miniature solid state device 78 which includes a second electrode 80 separated by an insulator 82. Electrode 80 is in electrically conductive contact with one end 83 of a movable electrode 84 which has its opposite end 86 extend through an insulator 88 positioned so that it may be in electrically conductive contact with only the ground terminal 42, provided in the station protector 10. The fusible pellet 72, miniature solid state device 78, movable electrode 84 and the insulator 88 are adapted to be inserted into the canister or housing 70, which in turn is adapted to be inserted into the cartridge 50 with a coil spring 90 disposed between the closed end 92 of the canister 70 and the top portion or head 54 of the protector cartridge 50. An open air space 94 provided in the insulator allows for movement of the movable electrode 84 within the insulator 88.

When initially installed in each of the well-like apertures 34 and 40, the surge protection device 64 has the opposite end 86 of movable electrode 84 only in contact with the ground 42 and the housing or canister 70 is displaced from the ground terminal 42, thereby making no contact therewith. The closed end 92 of the canister 70 is in electrically conductive contact with the fusible pellet 72 which in turn is in contact with the first electrode 76 of the miniature solid state device that has its second electrode 80 in electrically conductive contact with the top surface 96 of movable electrode 84. Thus, a miniature solid state device 78 is positioned to be between each of the communication lines 26 and 28 and ground 42.

In operation, should an overvoltage exist between one terminal 18 or 20 and the ground terminal 12, the miniature solid state device would break down thus, causing an overcurrent and additional (a greater than normal) rise in temperature causing the fusible pellet 72 to partially melt permitting the miniature solid state device 78 to be absorbed into the fusible pellet with the melted portion of the fusible pellet flowing into the open air space 94. The spring 90 disposed between the closed end 92 of the canister 70 and the end wall 58 of the cartridge shell 52 would urge the canister away from the top portion 54 of the cartridge 50, thus causing the open end 69 of canister 70 to come into electrically conductive contact with the ground terminal 42, providing a fail short condition across the line terminal that experienced the overvoltage. In addition the fusible pellet 72 that melted because of the overheating provides an additional conductive path shorting the electrodes 76 and 80 of the miniature solid state device 78. The overvoltage or failed condition is shown in FIG. 4.

Referring now to FIGS. 6, 7, 8 and 9, there is shown a miniature central office solid state surge protector 100 apparatus which includes a bifurcated base 102 having portions 102a and 102b and a cover 104, which is provided with a pair of elongated apertures 106 and 108 that are adapted to receive cooperating protrusions 112a and 112b, provided on base portions 102a and 102b, respectively, thereby holding the complete assembly together.

Figures 6, 7:
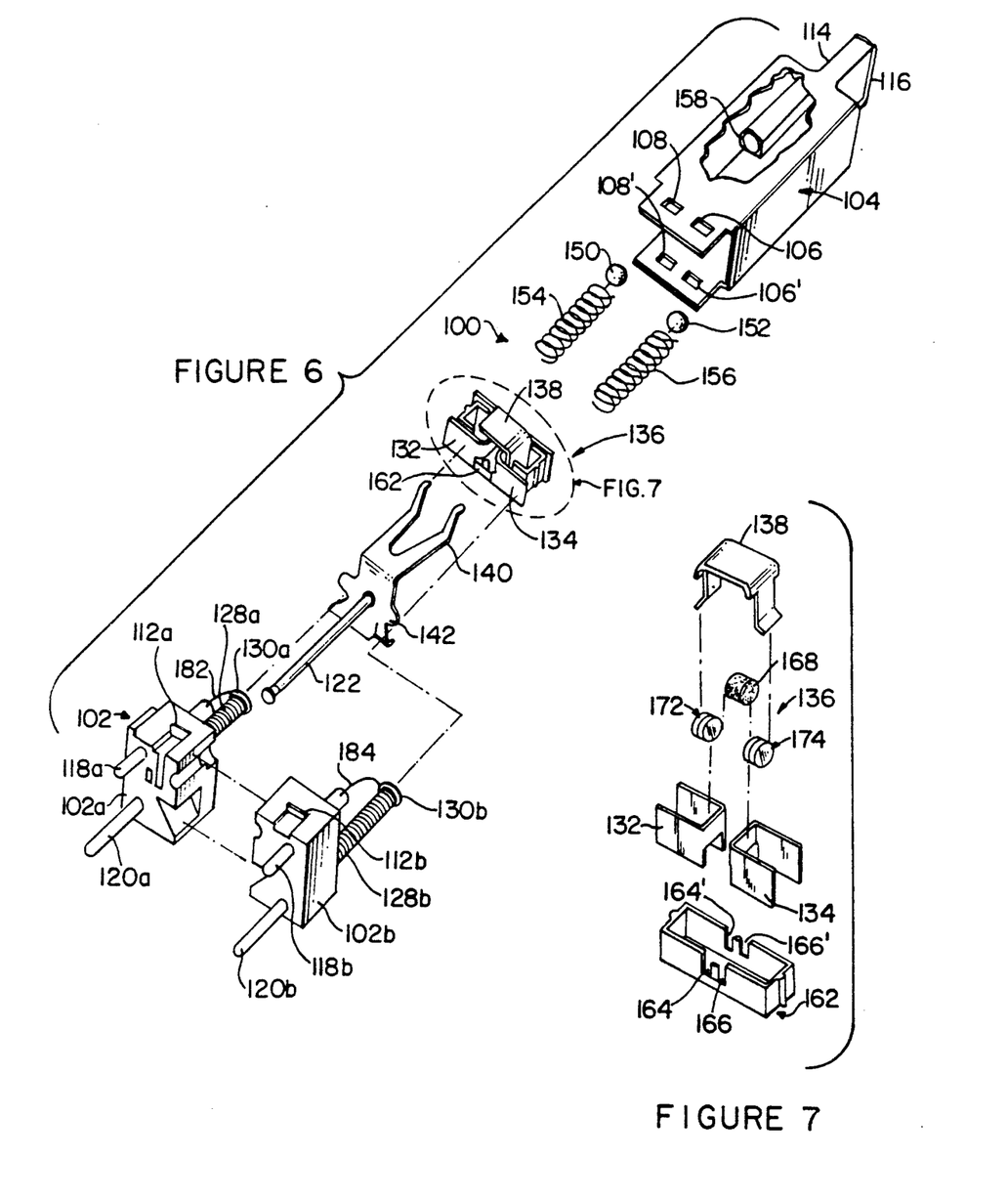
FIG. 6 is a greatly enlarged, exploded perspective view of a miniature solid state central office surge protection apparatus for central office use or the like, according to the principles of the present invention.
FIG. 7 is an enlarged exploded view in perspective of the overvoltage protection device encompassed within the broken line of FIG. 6.

The cover 104 is preferably provided with an upwardly extending portion 114 having a horizontal portion 116 at the distal end thereof ideally suitable for engagement of the fingers of a service technician who may remove the entire surge protector 100 from its mounted position in the telephone central office terminal block, not shown, by exerting upward pressure thereon. Alternatively, a tool, not shown, may be inserted under the horizontal portion 116 and may readily be used to remove the surge protector 100 from its mounted position in the terminal block. The cover 104 is preferably fabricated from an insulating material such as a thermoplastic, thermoset, etc., e.g. hard rubber, phenolic, Bakelite, etc., and is preferably provided with two pairs of rectangularly-shaped apertures 106, 106' and 108, 108' provided at the lower distal end of the cover 104 which are adapted to cooperate with and engage two pairs of protrusion 112a, 112a', 112b and 112b' provided on the bifurcated base 102a and 102b, respectively, which is preferably fabricated with the same material utilized for the cover 104. The overall size of the surge protector apparatus 100 is preferably approximately 2¼ inches by ¾ of an inch by ½ inch (6.4 cm × 2 cm × 1.3 cm).

The insulated base 102 is provided with a plurality of downwardly extending pins or terminals 118b and 120b provided in base portion 102a and 102b, respectively. These terminals are adapted to be received by receptacles provided in the central office telephone terminal block (not shown) utilized for the termination of pairs of communication lines 26 and 28 as shown in FIG. 1. The pins or terminals 118a, 118b, 120a and 120b are made of metal and continue the electrical conductive path from each of the receptacles provided in the terminal block into the miniature solid state surge protector apparatus 100 and are inserted in the base 102 in a conventional manner, which may include an ultrasonic technique known in the art.

Figure 10:
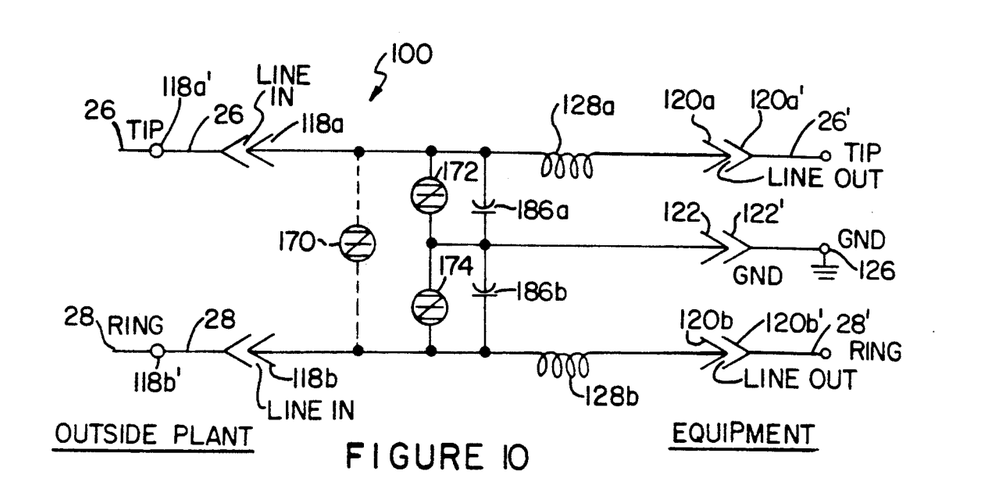
FIG. 10 is a schematic circuit diagram of the miniature solid state surge protector apparatus for central office use showing the location of the fail safe shorting contacts, the solid state overvoltage device and heating coils.

The central office terminal block is provided with two pairs of in-line terminals having an open circuit therebetween, as shown in FIG. 10. The central office receptacles 118a' and 118b', 120a' and 120b' are adapted to receive the respective terminals identified as 118a and 120a, 118b and 120b. The ground terminal 122 is received by the ground receptacle 122'. The central office receptacles 118a', 120a', 118b' and 120b' are adapted to receive the respective terminals identified as 118a, 120a, 118b and 120b. Ground terminal 122 is received by the ground terminal receptacle 122' provided on the central office terminal block. Receptacles 118a' and 120a' are defined as one pair of in-line terminals since they are disposed in a communication line 26 which remains open unless the surge protector 100 has been plugged into the terminal block. Communication line 28 similarly remains open unless the surge protector 100 has been plugged into the terminal block. Connection to earth ground 126 is made through receptacle terminal 122' which provides electrical conductive contact through terminal 122 when surge protector 100 is plugged into the terminal block. A more detailed description of the electrical circuit arrangement will be discussed hereinafter.

Referring now specifically to FIG. 6, an electrically conductive component 128a and 128b, such as a pair of heating coils 128a and 128b, whose function is more clearly described in association with FIGS. 8 and 9 hereinafter, is connected to the opposite ends 130a and 130b, respectively, of terminals 120a and 120b that extends upwardly and is in electrical conductive contact with the first terminal 132 (tip) and the second terminal 134 (ring) of a miniature solid state surge protector assembly 136 shown encompassed within the broken line 7 and which is shown in an exploded view in FIG. 7. Also included in the solid state surge protector assembly 136 is a ground terminal 138 which when assembled comes into electrical conductive contact with generally, two tined, forked shaped distal end 140 of ground terminal 122 that extends upwardly thereby providing an electrically conductive path directly to ground. The ground terminal 138 also includes a transverse portion 142 extending traversely towards terminals 120a and 120b disposed proximate the heating coils 128a and 128b.

The cover 104 is provided with a pair of apertures 144 and 146 in the closed end 148. A ball contact 150 and 152 seated in apertures 144 and 146 are held in position by springs 154 and 156, respectively, disposed in tubular openings 158 and 160 provided in the cover 104. The opposite end of springs 154 and 156 are urged against the first and the second terminals 132 and 134, respectively, of the surge protector assembly 136, thus providing an electrically conductive contact between a probe inserted into aperture 144 or 146 to the first terminal (tip) or second terminal 134 (ring) of the communication lines 26 and 28.

FIG. 7 is an exploded view slightly enlarged of the surge protector assembly 136 that is seen to include an insulated housing 162, which is generally elongated and is provided with two pairs of slots 164, 164', 166 and 166' that are adapted to receive generally U-shaped terminals 132 (first) and 134 (second) therein, respectively. An insulator 168 may be inserted between the generally U-shaped clips 132 and 134, or alternatively, a solid state device 170 (shown in FIG. 10) has its electrodes extending between the U-shaped bracket 132 and the U-shaped bracket 134, thus providing breakover protection between the tip and ring line terminals (first terminal and second terminal). Solid state devices 172 and 174 are positioned within the housing 162 with one set of electrodes on each device in electrically conductive contact with the first terminal 132 and the second terminal 134, respectively. The second terminals of solid state devices 172 or 174 are in electrically conductive contact with ground clip 138, which holds them in position within the housing 162, and thereby, provides overvoltage protection between each line and the ground terminal.

Figure 8:
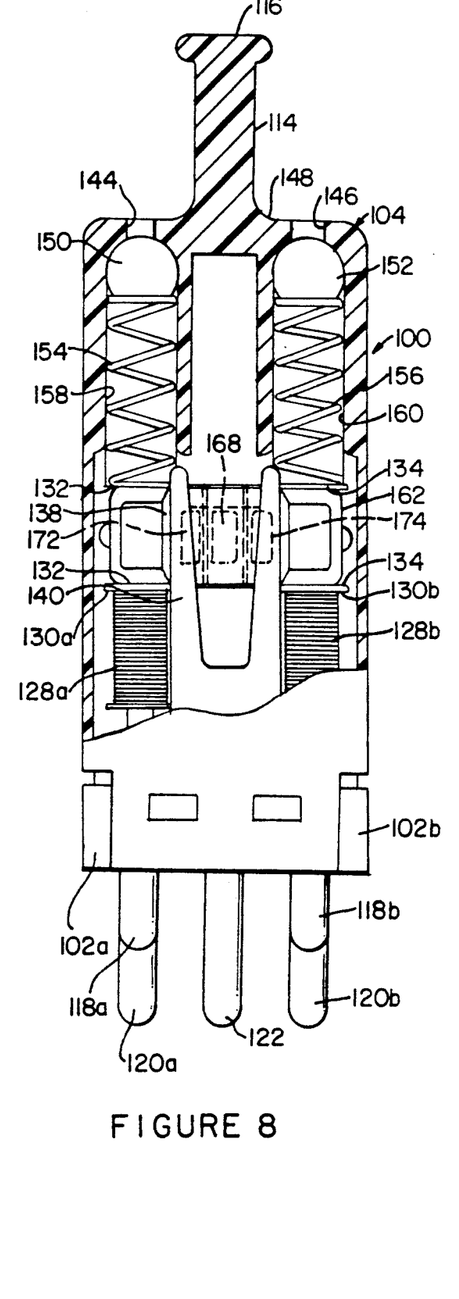
FIG. 8 is a greatly enlarged, partially broken away front view of the miniature solid state surge protector apparatus for central office use.
Figure 9:
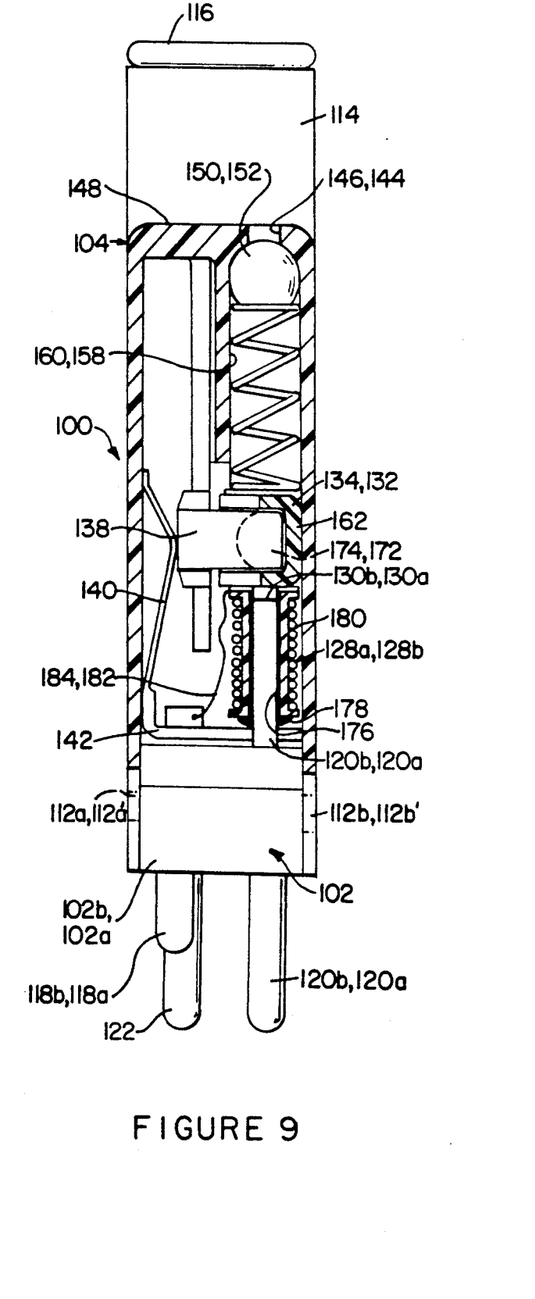
FIG. 9 is an end view partially broken away of the miniature solid state surge protector apparatus shown in FIG. 8.

Referring now specifically to FIGS. 8 and 9, which are cross-sectional views, front and side, of the miniature solid state surge protector apparatus 100 and in particular FIG. 9 where one can readily see the construction of the heating coil 128b disposed upon terminal 120b by means of low temperature solder 176, which is utilized to hold the bobbin 178 on the terminal 120b in a fixed position. Resistance wire 180 is wound on the bobbin and when excessive current flows through the wire, it will cause the low temperature solder 176 to melt, thereby forcing the metal portion of the bobbin to come into contact with the ground terminal at the transverse portion 142 of the ground terminal 122. A conductive wire 182 and 184 connects the terminal 118a and 118b to the end of the heat coil 128a and 128b, respectively. If it is so desired that a heating coil not be used, the same circuit arrangement can be accomplished with the conductive path being made between the terminals 118a and 120a and 118b and 120b in another manner.

Referring now to FIG. 10 which is an electrical schematic circuit diagram of the miniature solid state surge protector apparatus 100, with the receptacle terminals 188a', 118b', 120a', 120b' and 122' being provided on the central office terminal block. The terminal 118a' is connected to the tip circuitry disposed on the outside plant line and terminal 120a' is connected to the tip circuitry disposed on the equipment side with terminal 118b' connected to the ring circuitry disposed on the outside plant line and terminal 120b' is connected to the ring circuitry disposed on the equipment side of the line of the central office terminal block. The miniature solid state surge protector apparatus 100 provides continuity between the outside plant lines 26 and 28 and the equipment lines 26' and 28'. Continuity is provided by terminals 118a, via a heat coil or an electrically conducting line 128a to terminal 120a for the tip line and terminal 118b, via coil 128b to terminal 120b. The ground connection is made, via terminal 122, which is received into receptacle 122' that is connected to earthground 126. The fail short connections 186a and 186b are connected from ground terminal 122 to both the tip and ring side of the line. Solid state protection devices 172 and 174 are connected between the tip and ring and ground, respectively. If a third semi-conductor device 170 is to be utilized in lieu of the insulator 178, as explained hereinbefore, it will be connected across the tip and ring lines as shown in the broken lines of FIG. 10.

In operation, with no overcurrent surges or overvoltage transients, the contacts 186a and 186b do not make electrical conductive contact with the transverse portion 142 of ground terminal 122. The surge protector 100, when plugged into the central office terminal block, merely provides the necessary continuity between lines 26 and 28. The heating coils 128a and 128b are preferably made with resistance wire to supply sufficient heat during an overcurrent to cause the heating coils to move along the contacts 120a and 120b. Springs 154 and 156 urge the heating coils to make contact with the transverse portion 142 of ground terminal 122, should an overcurrent occur. An overcurrent surge need not occur on both lines simultaneously for this to happen, since an overcurrent in either one of the communication lines 26 and 28 will cause the low temperature solder holding the bobbin 178 to move along the contacts 120b or 120a because of heat generated through the resistance wire of the heating coils. In a like manner, should an overvoltage appear on the communication lines 26 and 28 the solid state device will break over causing an overcurrent to occur, thereby providing a fail short when heating coils are utilized. If a solid state device is damaged, a central office test technician can readily determine which line has a short thereon and will dispatch a repair technician to remove the now defective surge arrester 100 from the terminal block replacing it with a new operable unit.

Hereinbefore has been disclosed a relatively simple, reliable, inexpensive, miniature solid state surge arrester apparatus ideally suited for use on central office terminal blocks, or the like adapted to receive them, and a miniature solid state surge protection device suitable for insertion into an overvoltage protection cartridge known in the art. It will be understood that various changes in the details, materials, arrangement of parts and operating conditions, which have been herein described and illustrated in order to explain the nature of the invention may be made by those skilled in the art within the principles and scope of the instant invention.

Having thus set forth the nature of the invention, what is claimed is:

1. A miniature solid state surge protector apparatus for central office use, or the like, comprising, in combination:
   a) an insulated base means adapted to be received by a central office terminal block having two pairs of in-line open terminal receptacles, one pair of terminal receptacles being disposed in each of a pair of communication lines, and a ground terminal receptacle, said base means including;
      i) two pairs of extending terminals adapted to be received by the receptacles of said central office terminal block providing electrical conductive contact therebetween,
      ii) electrically conductive means connecting a first and a second terminal of each said pair of extending terminals; and
      iii) a ground terminal extending on one end adapted to be received by the ground receptacle of said central office terminal block and being provided on the other end with an upwardly extending portion and a transverse portion, said transverse portion being disposed proximate each pair of said extending terminals;
   b) a miniature solid state surge protector assembly including;
      i) an insulated housing means adapted to receive a first and a second solid state device with an insulator means disposed therebetween having a first terminal, a second terminal and a ground terminal,
      ii) said first protector assembly terminal disposed between said insulator means and one electrode of said first solid state device, said one electrode being in electrically conductive contact with said first protector assembly terminal, said second protector assembly terminal disposed between said insulator means and one electrode of said second solid state device, said one electrode of said second solid state device being in electrically conductive contact with said second protector assembly terminal, and
      iii) said protector ground terminal being in electrically conductive contact with the other electrodes of said first and said second solid state protection devices and adapted to be in electrically conductive contact with the upwardly extending portion of said base means ground terminal;
   c) insulated cover means having an open end and a closed end, said open end being adapted to be removably retained by said base means and encompassing said first and second solid state devices; and
   d) first and second spring means disposed within said insulated cover means, said first spring means being disposed between said cover means and said first solid state protector assembly terminal, said second spring means being disposed between said cover means and said second solid state protector assembly terminal, said first and second spring means urging said first and second protector terminals toward said insulated base means.

2. A miniature solid state surge protector apparatus for central office use, according to claim 1 wherein said base means is bifurcated and each half includes one of said pair of extending terminals and is provided with protruding tabs adapted to be received in cooperating apertures provided on said insulated cover means proximate said cover means open end.

3. A miniature solid state surge protector apparatus for central office use, according to claim 1 wherein said electrically conductive means connecting the first and the second terminal of said pair of extending terminals includes:
   a) heating coil means disposed proximate the opposite end of each one of said pair of extending terminals disposed within said insulated cover means and being in movable electrically conductive contact with said one terminal, said heating coil means being maintained in a first position, said heating coil means being moved into a second position responsive to a current overload through said heating coil means, said second position of said heating coil means providing electrical conductive continuity between said extending terminal and the transverse portion of said ground terminal.

4. A miniature solid state surge protector apparatus for central office use, according to claim 1 wherein said first and said second spring means includes a ball contact disposed on one end thereof adapted to be received and retained in a through aperture provided in the closed end of said cover means, the other end of said spring means being in electrically conductive contact with the first and the second terminals of said solid state surge protector assembly.

5. A miniature solid state surge protector apparatus for central office use, according to claim 1, wherein said insulator means disposed between said first and said solid state devices is replaced with a third solid state device.

6. A miniature solid state surge protector apparatus for central office use, according to claim 1 wherein said base means includes electrically conducting means disposed between each one of said pair of extending terminals disposed within said insulated cover means being in movable electrically conductive contact with each one of said pair of terminals, said conducting means being maintained in a first position; said conducting means being moved into a second position responsive to a current overload through said conducting means, said second position of said conducting means providing electrical conductive continuity between said extending terminal and the transverse portion of said ground terminal.

7. A miniature solid state surge protector apparatus for central office use, or the like, comprising, in combination:
   (a) an insulated base means adapted to be received by a central office terminal block having two pairs of in-line open terminal receptacles, one pair of terminal receptacles being disposed in each of a pair of communication lines, and a ground terminal receptacle, said base means including;
      i) two pairs of extending terminals adapted to be received by the receptacles of said central office terminal block providing electrical conductive contact therebetween,
      ii) electrically conductive means connecting a first and a second terminal of each said pair of extending terminals; and
      iii) a ground terminal extending on one end adapted to be received by the ground receptacle of said central office terminal block and being provided on the other end with an upwardly extending portion and a transverse portion, said transverse portion being disposed proximate each pair of said extending terminals;

b) a miniature solid state surge protector assembly including;
  i) an insulated housing means adapted to receive a first and a second solid state device with an insulator means disposed therebetween and having a first terminal, a second terminal and a ground terminal,
  ii) said first protector assembly terminal disposed between said insulator means and one electrode of said first solid state device, said one electrode being in electrically conductive contact with said first protector assembly terminal, said second protector assembly terminal disposed between said insulator means and one electrode of said second solid state device, said one electrode of said second solid state device being in electrically conductive contact with said second protector assembly terminal, and
  iii) said protector ground terminal being in electrically conductive contact with the other electrodes of said first and said second solid state protection devices and adapted to be in electrically conductive contact with the upwardly extending portion of said base means ground terminal;
c) insulated cover means having an open end and a closed end, said open end being adapted to be removably retained by said base means and encompassing said first and second solid state devices; and
d) first and second spring means disposed within said insulated cover means, said first spring means being disposed between said cover means and said first solid state protector assembly terminal, said second spring means being disposed between said cover means and said second solid state protector assembly terminal, said first and second spring means urging said first and second protector terminals toward said insulated base means.

8. A miniature solid state surge protector apparatus for central office use according to claim 7 wherein said solid state surge protector assembly comprises:
  a) an insulated housing means adapted to receive said first and said second solid state devices with a third solid state device disposed therebetween,
  b) said first protector assembly terminal disposed between said third solid state device and one electrode of said first solid state device, said one electrode being in electrically conductive contact with said first protector assembly terminal, said second protector assembly terminal disposed between said third solid state device and one electrode of said second solid state device, said one electrode of said second solid state device being in electrically conductive contact with said second protector assembly terminal, said third solid state device having one electrode in electrically conductive contact with said first protector assembly terminal and the other electrode of said third solid state device being in electrically conductive contact with said second protector assembly terminal; and
  c) a protector ground terminal in electrically conductive contact with the other electrodes of said first and said second solid state protection devices and adapted to be in electrically conductive contact with the upwardly extending portion of said base means ground terminal.

* * * * *